United States Patent [19]
Landrus et al.

[11] 3,739,807
[45] June 19, 1973

[54] VALVING ARRANGEMENT

[75] Inventors: James D. Landrus, Plainfield; Allan S. Norris; John O. Edmunds, both of Indianapolis, all of Ind.

[73] Assignee: General Motors Corporation, Detroit, Mich.

[22] Filed: Mar. 27, 1972

[21] Appl. No.: 238,152

[52] U.S. Cl.................. 137/469, 137/494, 137/538
[51] Int. Cl............................................. F16k 45/00
[58] Field of Search ................. 137/494, 529, 488, 137/514.5, 535, 528, 538, 540, 543.19, 471, 469, 474

[56] References Cited
UNITED STATES PATENTS

| | | | |
|---|---|---|---|
| 935,709 | 10/1909 | Turner | 137/469 |
| 3,154,095 | 10/1964 | Cleminshaw et al | 137/514.5 X |

*Primary Examiner*—Henry T. Klinksiek
*Assistant Examiner*—Robert J. Miller
*Attorney*—Warren E. Finken, A. M. Heiter and John P. Moran

[57] ABSTRACT

The drawings illustrate an improved dual-rate trimmer-valve for use with clutch and/or brake arrangements of an automatic transmission, wherein a valve element is first moved under a low fluid pressure to a clutch-regulating position while the clutch chamber is being filled with fluid. In one embodiment the valve element moves against a light spring force and in another embodiment such movement is unopposed. An orifice in an end wall of the valve element permits the fluid to continuously flow to an adjacent chamber to progressively move an initially adjacent plug member away from the valve element toward a stop member, against a predetermined spring force resulting from two oppositely disposed springs. Once the plug member has moved a predetermined distance and downshifting, for example, is accomplished, one of the two springs becomes ineffective, and the regulating effect of the remaining spring on the plug member and back through the fluid medium to the valve element and, hence, on the clutch or brake engagement process during upshifting, for example, increases thereafter at a slower rate than was the case while the two springs were exerting a combined varying influence on the valve element, until contact is made with the stop member. At this point, full clutch engagement is complete, and, due to a differential area feature on the valve element and/or an adjacent spring, the valve element is snapped back to the initial nonregulating position.

11 Claims, 5 Drawing Figures

Patented June 19, 1973 3,739,807

VALVING ARRANGEMENT

This invention relates generally to automatic transmissions and, more particularly, to dual-rate clutch-and/or brake-application valves therefor.

Clutch-application valves or so-called "trimmer-valves" are employed in the hydraulic systems of automatic transmissions to regulate or "trim" clutch-application pressure during initial application to prevent abrupt engagement thereof. This is accomplished by valving-off part of the clutch-application pressure until the clutch is partially engaged, after which full main pressure is used to complete the engagement of the clutch.

While prior art single-rate trimmer-valves have been effective during upshifting operations, they have not proved to be as effective during downshifting.

Accordingly, a general object of the invention is to provide an improved dual-rate trimmer-valve which is highly effective and efficient during both upshifting and downshifting of an automatic transmission.

Another object of the invention is to provide an improved dual-rate trimmer-valve wherein an initial rate of trim starts at substantially "zero" pressure and increases in a predetermined short period of time to trim a downshift to an intermediate clutch-pressure range and increases at a slower predetermined rate to trim an upshift to that same range without danger of the engine overrunning or the clutch overheating.

A further object of the invention is to provide an improved dual-rate trimmer-valve wherein a valve element is first moved under a low fluid pressure to a clutch-regulating position, in one embodiment against a light spring force and in another embodiment, unopposed. An orifice formed through an end wall of the valve element permits the fluid to flow to a chamber downstream of the valve element to progressively move an adjacent plug away from the valve element, against a predetermined spring force determined by two oppositely disposed springs. Once the plug has moved a predetermined distance, one of the two springs becomes ineffective, and the regulating effect of the remaining spring on the valve element increases thereafter at a slower rate than was the case while the two springs were exerting a combined influence on the valve element. Due to differential areas on the valve element, and/or an adjacent spring, the resultant pressures thereon cause the valve element to move back to its initial non-regulating position.

These and other objects and advantages of the invention will become apparent when reference is made to the following description and accompanying drawings, wherein.

Figure 1:
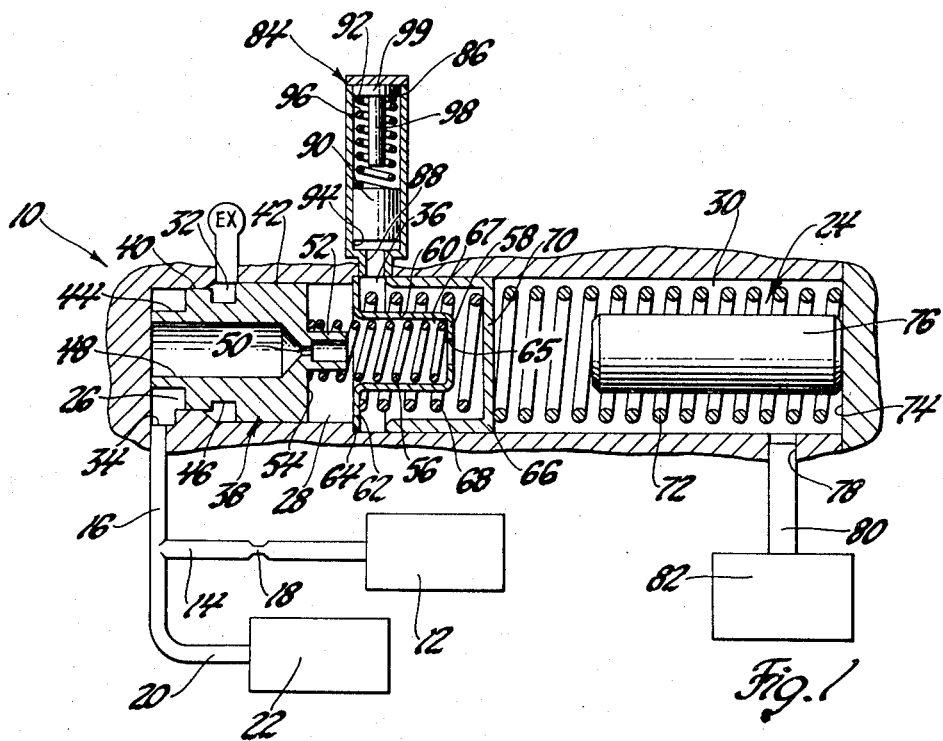
FIG. 1 is a cross-sectional view of a clutch-application valve embodying the invention.

Referring now to the drawings in greater detail, FIG. 1 illustrates a dual-rate trimmer-valve 10 which receives a fluid medium under pressure from a suitable selector device 12 via main feed conduits or selected brake-apply lines 14 and an associated branchline 16. An orifice 18 is formed in the line 14. The pressure of this fluid medium is "trimmed" or regulated by the trimmer-valve 10 and communicated by the line 16 and a branchline 20 to a clutch 22 to prevent an abrupt engagement of the latter.

The trimmer-valve 10 includes a bore 24 having first, second, and third progressively larger diameter chambers 26, 28, and 30, respectively, the chamber 26 being an inlet chamber. An exhaust port 32 is formed in the second chamber 28, and ports 34 and 36 are formed in the first and third chambers 26 and 30, respectively. The line 16 communicates with the port 34.

A regulator valve element 38 includes respective small and large lands or surfaces 40 and 42 slidably mounted in the chambers 26 and 28, respectively. Annular grooves 44 and 46 are respectively formed on the end of the valve element 38 adjacent the land 40 and intermediate the lands or surfaces 40 and 42, so as to communicate with the ports 34 and 32, respectively. A cavity 48 is formed in the center of the valve element 38, fully open at the groove-end 44 and, hence, communicating with the first chamber 26. An orifice or fixed restriction 50 is formed at the other end of the valve element 38, communicating between the cavity 48 and the chamber 28.

A cylindrical extension 52 is formed on an end face 54 of the valve element 38 concentric with the orifice 50. A spring 56 is mounted around the extension 52, abutting at one end thereof against the end face 54, and at the other end thereof against the closed end 58 of a cup-shaped retainer 60. A fixed flange 62 is formed on the open end of the retainer 60, abutting against a shoulder 64 formed between the chambers 28 and 30. An unrestricted opening 65 is formed in the center of the end wall 58 of the retainer 60.

A cup-shaped plug member 66 is slidably mounted in the chamber 30, at times partially surrounding the retainer member 60. A second spring 68 is mounted within the cup-shaped plug member 66 and around the retainer 60, and between the inner surface of the closed end 70 of the plug member 66 and the flange 62 of the retainer 60, biasing the plug member 66 to the right in FIG. 1. In view of the unrestricted opening 65 in the retainer 60, the slidable plug member 66 forms a variable chamber 67 intermediate the end face 54 of the valve element 38 and the closed end 70 of the plug member 66.

A third spring 72 is mounted between the outer surface of the closed end 70 of the plug member 66 and an end wall or cover member 74 of the chamber 30, around a stop member 76 secured to the end wall 74, opposing the force of the spring 68.

A port 78 is formed in the valve 10 adjacent the end wall 74, communicating with the largest diameter chamber 30. A line or conduit 80 communicates between the port 78 and a conventional transmission clutch-trimmer pressure regulator, represented generally at 82.

An accumulator 84 including a housing 86 is mounted on the trimmer-valve 10, with a port 88 formed therein and communicating with the port 36 formed in the chamber 30. A plug member 90 is slidably mounted in the housing 86, biased toward the port 88 by a spring 92, and forming within the housing 86 two variable chambers 94 and 96. The spring 92 is mounted around a fixed stop member 98 between the plug member 90, and a fixed retainer 99 formed on the member 98.

OPERATION

Prior to the trim function, the minimal force of the spring 56 reacts on the end 58 of the retainer 60 to provide the only force on the valve element 38. This force is sufficient to cause the valve element 38 to retain the position shown in FIG. 1. At this time the spring 68 reacts on the fixed flange 62 of the retainer 60 to act against the end 70 of the plug member 66 and through the plug member 66 against the spring 72, the forces of the springs 68 and 72 being equal and opposite and thus grounded.

At the beginning of the trim cycle, fluid is delivered to the inlet chamber 26 and the cavity 48 of the valve element 38, via the lines 14 and 16 and the port 34, and proceeds to fill the chambers 26 and 48. Such fluid moves the valve element 38 to the right (FIG. 1) to the regulating position adjacent the right edge of the chamber 26, permitting communication between the line 16 and the exhaust port 32 to regulate the pressure in the lines 16 and 20 to the clutch 22. Such movement of the valve element 38 displaces fluid from the chamber 67 into the accumulator chamber 94, in turn, displacing the plug member 90 against the low force spring 92. The above movement of the valve element 38 to the regulating position results from an initial low pressure, equal only to the pressure required to move the valve element 38 against the spring 56. Thus, there is no engagement force on the plates (not shown) of the clutch 22 at this time.

The apply-pressure from the line 16 is also continuously communicated through the orifice 50 to the chamber 67 between the valve element 38 and the end wall 70 of the plug member 66 via the unrestricted opening 65, regulating the line 16 pressure upwardly as the plug member 66 is moved away from the retainer 60 against the force of the spring 72, compressing the latter. The apply-pressure, "$P_A$," thus increases in accordance with the resulting unbalance of forces of the springs 68 and 72, "$F_{68}$" and "$F_{72}$," respectively, as follows:

$$P_A = (F_{72} - F_{68})/A_{66}$$

where "$A_{66}$" is the area of the plug member 66 and "$F_{72}$" increases with displacement of the plug member 66 and "$F_{68}$" decreases with displacement of the plug member 66.

Figure 2:
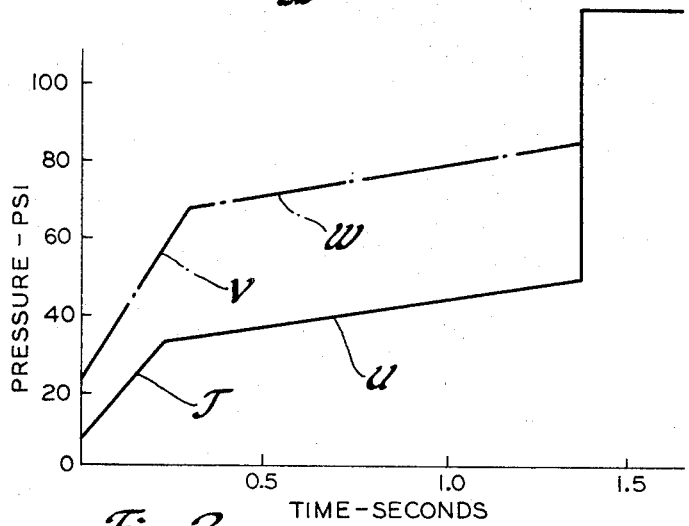
FIG. 2 is a graphic representation of operational characteristics of the invention.

Using typical spring design computations, the initial assembled force of the opposing springs 68 and 72 on the plug member 66 is 19.7 lbs., with the spring 68 having a possible deflection of 0.11 inch. When the plug member 66 has moved 0.11 inch, the force of the spring 68 will become "zero," and the force of the spring 72 will increase from 18 lbs. to 19.7 lbs. + 0.11 in. × 18 lbs. or 20.68 lbs. Thus, in the period of time required for oil to flow from the inlet port 34 through the chambers 26 and 48 and the orifice 50, to the chamber 67 to cause 0.11 inch movement of the plug member 66, the regulated pressure in the inlet chamber 26 will increase slightly more than "zero" to a value of about 32 psi (Curve "T," FIG. 2). Thereafter, the plug member 66 will move approximately 0.57 inch toward the stop member 76 increasing the force of the spring 72 on the plug member 66 to about 31 lbs., and the resultant regulated trim-pressure to about 48 psi (Curve "U," FIG. 2). The Curves "T" and "U" of FIG. 2 illustrate the above-described dual-stage pressures with respect to typical time intervals.

When the plug member 66 grounds out by abutting against the stop member 76, the equal pressure on both ends of the valve element 38, coupled with the force of the spring 56, causes the valve element 38 to snap or move quickly to the left (FIG. 1), concluding the trim cycle, and the clutch apply-pressure thereafter equals the mainline pressure. While both the differential areas of the valve element 38 and the spring 56 are shown and described, for some applications, one or the other of these features alone would be sufficient to return the valve element 38 to its nonregulating position.

It is suggested that the trimmer-valve 10 be located immediately adjacent the clutch or brake piston housing in order that the regulating or trimming effect of the valve 10 thereon not be diminished by virtue of a longer somewhat restricted interconnecting line arrangement.

While some transmission applications do not utilize a so-called "trim-boost" effect, there are those applications which do. When employed, a regulated fluid pressure is communicated to the chamber, via the line 80 from the transmission clutch-trimmer pressure regulator 82, adding a predetermined constant value to the regulating function of the springs 68 and 72. The higher pressure two-stage result is illustrated by Curves "V" and "W," FIG. 2.

FIG. 3 EMBODIMENT

Figure 3:
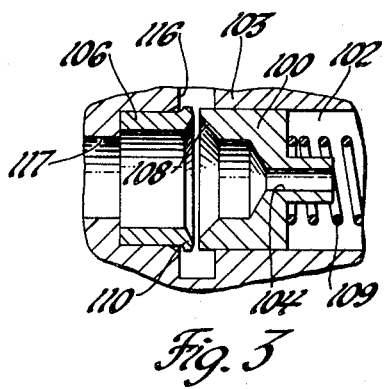
FIG. 3 is a fragmentary cross-sectional view of an alternate embodiment of a portion of the FIG. 1 structure.

FIG. 3 illustrates a "face seal-type" trimmer-valve embodiment which would eliminate the need for the accumulator 84 of FIG. 1. Specifically, a regulator valve element 100, slidably mounted in a chamber 102 of a valve body 103 and having an orifice 104 formed therein, replaces the valve element 38 of FIG. 1. A sleeve member 106 is press-fitted in the chamber 102 adjacent the open end 108 of the valve element 100. Otherwise, the elements not shown, but required for the FIG. 3 structure, are the same as those illustrated in FIG. 1; for example, the spring 109 is the same as the FIG. 1 spring 56, etc.

Figures 4, 5:
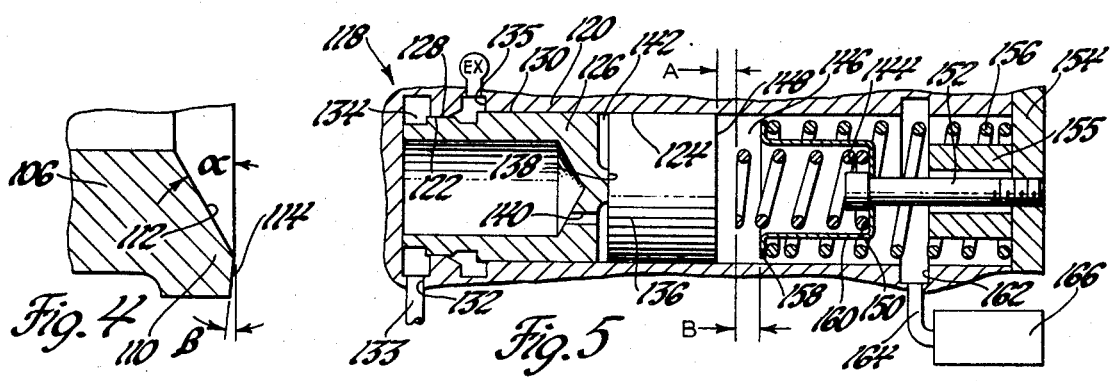
FIG. 4 is an enlarged fragmentary cross-sectional view of a portion of the FIG. 3 structure.
FIG. 5 is a cross-sectional view of still another alternate embodiment of the FIG. 1 structure.

The sleeve member 106 has formed on an end 110, adjacent the valve element 100, and internal chamfer 112 of a predetermined angle of, say, 60°, and an external chamfer 114 of a predetermined angle of, say, 1°, as illustrated in FIG. 4. The latter chamfer 114 serves to assure a line contact between the sleeve member 106 and the valve element 100, rather than an area contact on which impurities, such as dirt particles, could settle to detrimentally affect the regulating function of the valve element 100. The chamfered end 100 is located axially adjacent an exhaust port 116 formed in the valve body 103, while an inlet port 117 is formed in the end of the valve body 103.

In operation, the valve element 100 is initially caused by the fluid entering the port 116 to move a relatively short distance, say, 0.007 inch, apart from the sleeve member 106 to attain its regulating position, as compared to the movement of the valve element 38 of FIG. 1 over a substantially longer distance to attain its regulating position. Due to the significantly smaller movement, there is no need for the accumulator 84, as indicated above. Thereafter, the fluid, which is continuously flowing through the orifice 104 formed in the valve element 100, would function in the same manner as was described above relative to the operation of the FIG. 1 structure.

Inasmuch as the valve element 100 is illustrated as a single-diameter valve, the force of the spring 109 would be sufficient to return the valve element 100 to its non-regulating position at the conclusion of the trim cycle.

FIG. 5 EMBODIMENT

FIG. 5 illustrates still another trimmer-valve embodiment 118 including a valve body 120 having a first smaller bore 122 and a second larger bore 124 formed therein. A regulator valve element 126, having respective first and second lands 128 and 130 formed thereon, is mounted in the valve body 120 such that the land 130 slidably fits in the left end portion (FIG. 5) of the larger bore 124, while the land 128 at times slidably fits in the smaller bore 122 and at times is moved freely into the bore 124.

An inlet port 132 is formed in the valve body 120, communicating between a line 133 and the inlet chamber 134 formed by the bore 122, and an exhaust port 135 is formed in the valve body 120 into the bore 124 adjacent the left end (FIG. 5) of the land 130.

A plug member 136 is slidably mounted in the bore 124 adjacent an end face 138 of the valve element 126. An orifice 140 is formed through the end face 138, communicating between the inlet chamber 134 and a variable chamber 142 intermediate the valve element 126 and the plug member 136.

A first spring 144 is mounted in a chamber 146 of the bore 124 to the right (FIG. 5) of the plug member 136, intermediate an end face 148 of the plug member 136 and a retainer 150 slidably mounted on a pin 152 mounted on the right end cover 154 (FIG. 5) of the bore 124. A stop member 155 is secured to the end cover 154 around the pin 152.

A second spring 156 is mounted around the pin 152, between the end cover 154 and a flange 158 formed on a cylindrical extension 160 of the retainer 150.

A port 162 is formed in the valve body 120 adjacent the end cover 154, communicating with the chamber 146. A line or conduit 164 communicates between the port 162 and a conventional transmission clutch-trimmer pressure regulator, represented generally at 166, as was the case with the FIG. 1 trim-boost feature.

In operation, the fluid medium entering the inlet chamber 134 via the line 133 and the inlet port 132 from a suitable selector device, such as the device 12 of FIG. 1, acts on the area defined by the land 128 to bias the regulating valve element 126 to the right (FIG. 5) to the regulating position at the right-hand edge of the smaller bore 122, permitting communication between the line 133 and the exhaust port 135 to regulate the pressure in the line 133 to the clutch, such as the clutch 22 of FIG. 1. At this point, the plug member 136 is in contact with the adjacent end of the spring 144, having traversed the distance "A" (FIG. 5). The initial trim cycle thus starts at near "zero" pressure being simply determined by the restricted flow of fluid from the inlet port 132 past the edge of the valve element 126 to the exhaust port 135.

Fluid at apply-pressure from the line 133 is also continuously flowing through the orifice of the valve element 126 to the variable chamber 142 and begins to displace the plug member 136 from the valve element 126 against the spring 144, causing increased spring force therein. Thus, during movement of the plug member 136 through the distance "B" (FIG. 5), the rate of increase of the force of the spring 144 determines the rate of trim-pressure rise in the line 133, the build-up of volume of the fluid medium in the variable chamber 142 between the valve element 126 and the plug member 136 all the while seeking reaction to ground through the spring system.

Once the spring 144 compresses through the distance "B," the plug member 136 engages the flange 158 of the retainer 150. By design, the trapped force of the spring 156 is equal to the force of the spring 144 when the plug member 136 rests on the flange 158. Thus it may be understood that, under these conditions, the spring 144 ceases to be a factor in regulation, and continued movement of the plug member 136 thereafter causes the spring 156 to be the sole regulating bias.

Graphically, once the plug member 136 contacts the spring 144, the regulated pressure increases along the curve "T" (FIG. 2), as determined by the rate of the spring 144. Then, once the spring 156 becomes operational, the rate of pressure increases along curve "U" (FIG. 2), as determined by the rate of the spring 156.

When the plug member 136 grounds out by virtue of the retainer 150 abutting against the stop member 155, with the pressure being equal on both ends of the valve element 126, such pressure on the differential area between right- and left-hand ends of the valve element 126 moves the latter to the left, concluding the trim cycle, and the clutch apply-pressure thereafter equals the mainline pressure.

As was suggested with respect to the trimmer-valve 10, it would be preferred that the trimmer-valve 118 be located immediately adjacent the clutch piston housing in order that the regulating or trimming effect of the valve 118 thereon not be diminished by virtue of a longer somewhat restricted interconnecting line arrangement.

Again, some transmission applications require a trim-boost effect, similar to that described above relative to the FIG. 1 structure. Again, a regulated fluid pressure is communicated to the spring chamber 146 via the line 164 from the transmission clutch-trimmer pressure regulator 166, adding a predetermined constant value to the regulating function of the springs 144 and 156, with a two-stage result similar to the curves "V" and "W" of FIG. 2, as compared to the curves "T" and "U" illustrating the operation without the trim-boost feature.

It should be apparent that the invention provides an improved trimmer-valve arrangement wherein the regulated pressure is varied at two different controlled rates, as required for efficient engaging actuation of the clutch or brake of an automatic transmission during upshifting and/or downshifting operations thereof.

While but three embodiments of the invention have been shown and described, other modifications thereof are possible.

We claim:

1. A regulating valve arrangement comprising a valve housing, a valve element slidably mounted in said housing, a source of fluid under low pressure, an inlet formed in said housing for communicating said fluid under low pressure to one end of said valve element, an exhaust port formed in said housing adjacent said valve element, an orifice formed in the other end of said valve element, the pressure of said fluid being sufficient to quickly move said valve element to a regulating position while said fluid continuously flows through said orifice, a plug member slidably mounted in said housing downstream of said valve element and movable away from said valve element as a result of the volume of said fluid flowing through said orifice, first and second oppositely disposed springs movable at a first combined spring rate in response to said movement of said plug member away from said valve element to thereby cause said valve element in said regulating position to progressively increase the pressure of said fluid at a first predetermined rate, said first spring becoming ineffective after movement thereof through a first predetermined distance, said second spring thereafter being compressed at a second spring rate in response to further movement of said plug member away from said valve element to thereby cause said valve element in said regulating position to progressively further increase the pressure of said fluid at a second slower predetermined rate, a stop member for stopping said plug member after movement thereof through a predetermined distance, and return means associated with said valve element for aiding the pressure of said fluid thereon to cause said valve element to return to a nonregulating position once said plug member abuts against said stop member.

2. The regulating valve arrangement described in claim 1, wherein said return means includes differential end areas formed on said valve element, with the larger end area thereof being on the side of said valve element adjacent said plug member, and a spring abutting against said larger end area.

3. The regulating valve arrangement described in claim 1, and a spring retainer member secured in said valve housing intermediate said valve element and said plug member, an unrestricted opening formed in said spring retainer member, and a third spring mounted between said valve element and said spring retainer member.

4. The regulating valve arrangement described in claim 3, wherein said first of said first and second oppositely disposed springs abuts at one end thereof against said fixed spring retainer member and at the other end thereof against one side of said movable plug member, and said second spring abuts at one end thereof against the other side of said movable plug member and at the other end thereof against an end wall of said valve housing.

5. The regulating valve arrangement described in claim 4, and an accumulator mounted on said valve housing, an opening formed in said valve housing communicating between said accumulator and the space intermediate said plug member and said valve element.

6. The regulating valve arrangement described in claim 1, wherein said return means includes a spring mounted between said orifice-end of said valve element and a spring retainer secured in said valve housing, said spring retainer being mounted intermediate said valve element and said plug member.

7. The regulating valve arrangement described in claim 1, wherein said plug member is immediately adjacent said orifice-end of said valve element, a pin member secured to an end wall of said valve housing, a retainer slidably mounted around said pin member, a cylindrical wall formed on the side of said retainer opposite said housing end wall, and a flange formed on the open end of said cylindrical wall, said first of said first and second oppositely disposed springs is mounted in said cylindrical wall at times being compressed between said movable retainer and said movable plug member, and said second spring is mounted around said cylindrical wall and said stop member while compressed between said flange and said end wall of said valve housing.

8. The regulating valve arrangement described in claim 1, and a pressure regulator, a second source of fluid under constant pressure in said pressure regulator and a line communicating said fluid between said pressure regulator and the chamber housing said second spring.

9. A regulating valve arrangement comprising a valve housing having a two-diameter bore formed therein, a two-diameter valve element slidably mounted in said two-diameter bore, a source of fluid under low pressure, an inlet formed in said housing for communicating said fluid under low pressure to one end of said valve element, an exhaust port formed in the larger bore portion of said two-diameter bore adjacent said valve element, an orifice formed in the other end of said valve element, the pressure of said fluid being sufficient to quickly move said valve element to a regulating position with respect to said exhaust port while continuously flowing through said orifice, a plug member slidably mounted in said larger bor portion downstream of said valve element and movable away from said valve element as a result of said fluid flowing through said orifice, an open-ended spring retainer secured in said larger bore portion intermediate said orifice and of said valve element and said plug member, a separate spring mounted between said retainer and said valve element, first and second springs mounted on opposite sides of said plug member and movable at a first combined spring rate in response to said movement of said plug member away from said valve element to thereby cause said valve element in said regulating position to progressively increase the pressure of said fluid at a first predetermined rate, said first spring becoming ineffective after movement thereof through a first predetermined distance, said second spring thereafter being compressed at a second spring rate in response to further movement of said plug member away from said valve element to thereby cause said valve element in said regulating position to progressively further increase the pressure of said fluid at a second slower predetermined rate, and a stop member for stopping said plug member after movement thereof through a predetermined distance, said two-diameter valve member being caused to return to a nonregulating position once said plug member abuts against said stop member due to the pressure of said fluid on the two different end areas thereof and/or the force of said separate spring on the orifice-end of said valve element.

10. A regulating valve arrangement comprising a valve housing, a sleeve member press-fitted in said housing, a valve element slidably mounted in said housing adjacent said sleeve member, a source of fluid under low pressure, an inlet formed in said housing for communicating said fluid under low pressure through said sleeve member to the end of said valve element, an exhaust port formed in said housing adjacent the opposing faces of said sleeve member and said valve element, an orifice formed in the other end of said valve element, the pressure of said fluid being sufficient to quickly move said valve element to a regulating position slightly apart from said sleeve member while continuously flowing through said orifice, a plug member slidably mounted in said housing downstream of said valve element and movable away from said valve element as a result of said fluid flowing through said orifice, an open-ended spring retainer secured in said housing intermediate said orifice-end of said valve element and said plug member, a separate spring mounted between said retainer and said valve element, first and second springs mounted on opposite sides of said plug member and movable at a first combined spring rate in response to said movement of said plug member away from said valve element to thereby cause said valve element in said regulating position to progressively increase the pressure of said fluid at a first predetermined rate, said first spring becoming ineffective after movement thereof through a first predetermined distance, said second spring thereafter being compressed at a second spring rate in response to further movement of said plug member away from said valve element to thereby cause said valve element in said regulating position to progressively further increase the pressure of said fluid at a second slower predetermined rate, and a stop member for stopping said plug member after movement thereof through a predetermined distance, said separate spring serving to cause said valve element to return to a nonregulating position once said plug member abuts against said stop member.

11. A regulating valve arrangement comprising a valve housing having a two-diameter bore formed therein, a two diameter valve element slidably mounted in said two-diameter bore, a source of fluid under low pressure, an inlet formed in said housing for communicating said fluid under low pressure to one end of said valve element, an exhaust port formed in the larger bore portion of said two-diameter bore adjacent said valve element, an orifice formed in the other end of said valve element, the pressure of said fluid being sufficient to quickly move said valve element to a regulating position with respect to said exhaust port while continuously flowing through said orifice, a plug member slidably mounted in said larger bore portion immediately adjacent said orifice-end of said valve element and movable away from said valve element as a result of said fluid flowing through said orifice, a retainer slidably mounted in said larger bore portion, first and second springs mounted on opposite sides of said retainer and movable at a first combined spring rate in response to said movement of said plug member away from said valve element to thereby cause said valve element in said regulating position to progressively increase the pressure of said fluid at a first predetermined rate, said first spring becoming ineffective after movement thereof through a first predetermined distance, said second spring thereafter being compressed at a second spring rate in response to further movement of said plug member away from said valve element to thereby cause said valve element in said regulating position to progressively further increase the pressure of said fluid at a second slower predetermined rate, and a stop member for stopping said retainer after movement thereof through a predetermined distance, said two-diameter valve element being caused to return to a nonregulating position once said retainer abuts against said stop member due to the pressure of said fluid on the two different end areas thereof.

* * * * *